United States Patent
Brenner et al.

(10) Patent No.: US 11,663,086 B2
(45) Date of Patent: May 30, 2023

(54) FILE SYSTEM SLICING IN NETWORK ATTACHED STORAGE FOR DATA PROTECTION

(71) Applicant: EMC IP Holding Company LLC, Hopkinton, MA (US)

(72) Inventors: Adam Brenner, Mission Viejo, CA (US); Upanshu Singhal, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 57 days.

(21) Appl. No.: 17/070,918

(22) Filed: Oct. 15, 2020

(65) Prior Publication Data

US 2022/0121525 A1   Apr. 21, 2022

(51) Int. Cl.
| | |
|---|---|
| *G06F 17/00* | (2019.01) |
| *G06F 7/00* | (2006.01) |
| *G06F 11/14* | (2006.01) |
| *G06F 16/11* | (2019.01) |
| *G06F 16/951* | (2019.01) |
| *G06F 16/185* | (2019.01) |

(52) U.S. Cl.
CPC ...... *G06F 11/1451* (2013.01); *G06F 11/1464* (2013.01); *G06F 16/128* (2019.01); *G06F 16/185* (2019.01); *G06F 16/951* (2019.01); *G06F 2201/84* (2013.01)

(58) Field of Classification Search
CPC .. G06F 11/1451; G06F 16/951; G06F 16/128; G06F 16/185; G06F 11/1464; G06F 2201/84

USPC .......................................................... 707/645
See application file for complete search history.

(56) References Cited

U.S. PATENT DOCUMENTS

| | | | | |
|---|---|---|---|---|
| 7,606,868 B1* | 10/2009 | Le | ........................... | G06F 16/10 718/1 |
| 8,078,653 B1* | 12/2011 | Bisson | ................... | G06F 16/164 707/829 |
| 8,352,429 B1* | 1/2013 | Mamidi | ............... | G06F 16/2282 707/642 |
| 2005/0223278 A1* | 10/2005 | Saika | ................... | G06F 11/1461 714/E11.124 |
| 2007/0244938 A1* | 10/2007 | Michael | ................ | G06F 16/128 707/999.204 |
| 2010/0030983 A1* | 2/2010 | Gupta | ................... | G06F 11/1466 718/1 |
| 2010/0070725 A1* | 3/2010 | Prahlad | ................ | G06F 11/1453 718/1 |
| 2010/0262794 A1* | 10/2010 | De Beer | ............. | G06F 11/1458 718/1 |

(Continued)

*Primary Examiner* — Pavan Mamillapalli
(74) *Attorney, Agent, or Firm* — Staniford Tomita LLP

(57) ABSTRACT

Embodiments are described for storing array snapshots of a file system in networked attached storage (NAS) device. A system and process determine an organization of the file system comprising directories and files in a defined hierarchy, and a size of each file and a number of files in each directory. One or more slicer processes slice the file system into a number of slices, wherein each slice contains at least one of: a defined number of files or files having a defined total size. Backup agents are deployed as proxies to back up the slices to the NAS device, and the slices are backed up as array snapshots in the NAS device.

20 Claims, 9 Drawing Sheets

(56) References Cited

U.S. PATENT DOCUMENTS

| | | | |
|---|---|---|---|
| 2012/0066681 A1* | 3/2012 | Levy | G06F 9/45558 |
| | | | 718/1 |
| 2015/0112941 A1* | 4/2015 | Cai | G06F 11/1458 |
| | | | 707/649 |
| 2015/0370652 A1* | 12/2015 | He | G06F 11/1471 |
| | | | 714/19 |
| 2016/0253244 A1* | 9/2016 | Zhang | G06F 11/1451 |
| | | | 707/645 |
| 2020/0004438 A1* | 1/2020 | Jagannatha | G06F 11/1448 |
| 2020/0104050 A1 | 4/2020 | Srinivasan | |

* cited by examiner

US 11,663,086 B2

FILE SYSTEM SLICING IN NETWORK ATTACHED STORAGE FOR DATA PROTECTION

TECHNICAL FIELD

Embodiments are generally directed to data backup systems, and more file system slicers for network attached storage (NAS) devices.

BACKGROUND

Data protection comprising backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. Data protection of network attached storage (NAS) and similar devices is usually achieved using one of three methods: (1) array snapshots, (2) use of NDMP protocol, or (3) file system crawlers. All three approaches, however, present challenges that limit their usefulness.

A snapshot copy is a point-in-time copy of data that represents an image of a volume that can be used for data recovery of individual files or entire virtual machines or application servers. Snapshots in a storage array are managed by manipulating the metadata that is used to track the logical-physical relationship of LUNs and volumes to data on disk. When a snapshot copy is taken, the array replicates the metadata that maps the physical layout on the disk. An array-based snapshot is a copy of the image of a running virtual machine (VM) or application server at a specific point in time and, as a result, the snapshot will appear as a "crash copy" of that VM or application if it is fully restored and accessed. The snapshots on the array are based on a LUN or volume, which in turn, will map to a datastore in the hypervisor.

Array snapshots are typically provided in a proprietary vendor format and do not allow customers or backup vendors to restore data to an alternate device/model but only back to the same device/model. The Network Data Management Protocol (NDMP) was developed to transport data between network attached storage (NAS) devices and backup devices. This removes the need for transporting the data through the backup server s f, thus enhancing speed and removing load from the backup server. NDMP is a popular protocol which has been an industry standard for more than 20 years, but it also has challenges. Namely, NDMP has limited parallel capabilities, it is not able to scale to many hundreds of terabytes, and it requires specific workarounds for each vendor implementation of NDMP.

File system crawlers have been developed to work on network attached storage (NAS) devices and can solve certain challenges with array snapshots and NDMP. However, file system crawlers are considered slow due to having to traverse millions and billions of files over a network connection just to determine if a file has been modified. Current solutions run file system crawlers in parallel, which requires a first pass to determine the layout of the system and then backup the data. Other solutions involve providing NAS array APIs to identify which files have changed through processor-intensive tasks such as change file tracking or snapshot differencing.

What is needed, therefore, is a backup system that can intelligently slice a file system to maximize throughput and reduce processing time compared to present file system crawler solutions for taking array snapshots of file-level storage systems, like NAS.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
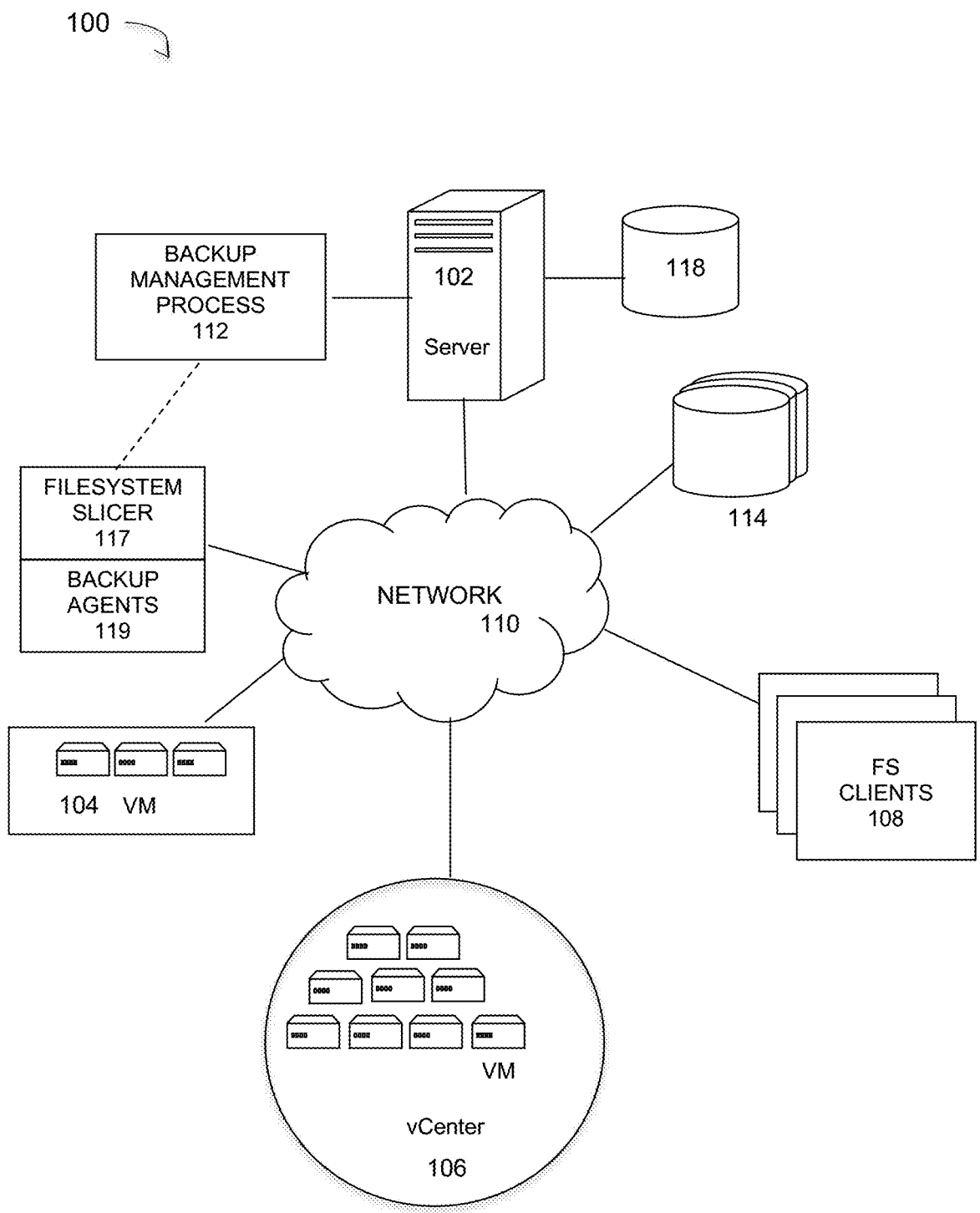
FIG. 1 is a diagram of a large-scale data backup system implementing a file system slicer and backup agent process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

The network may be a data storage network comprising large numbers of storage devices, such as disk drives, tape drives, solid state devices (SSD or flash), and the like. These storage devices may be organized in one or more arrays, and implement data storage protocols, such a network attached storage (NAS), and so on. FIG. 1 illustrates a computer network system 100 that implements one or more embodiments of an intelligent file system slicer method and system for NAS devices. System 100 represents a network backup system that can backup data from one or more data sources to one or more different storage media domains, such as a physical disk storage domains and virtual hard disk (VHD) domains.

Embodiments provide an intelligence file system slicing algorithm that slices (or partitions) any file system to maximize throughput and reduce wall clock time compared to present approaches described above. This is done by using a combination of slicing techniques done in real time across many threads and even separate instances of file system crawlers. In order to overcome the issue of traversing millions and billions of files over a network mount, embodiments include two processes, a slicer and backup agent. The slicer breaks up the file system into slices (units of work) and the backup agent performs the backup work, in which a unit of work is backup data.

In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108. Other data sources having data to be protected and backed up may include other VMs 104 and data in network storage 114.

The data sourced by the data source may be any appropriate type of data, such as database data that is part of a database management system. In this case, the data may reside on one or more storage devices of the system, and may be stored in the database in a variety of formats. One example is an Extensible Markup Language (XML) database, which is a data persistence software system that allows data to be stored in XML format.

A network server computer 102 is coupled directly or indirectly to the target VMs 106, and to the data sources 108 and 109 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

Besides VM storage, the data sourced by system 100 may be stored in any number of other storage locations and devices, such as local client storage, server storage (e.g., 118), or network storage (e.g., 114), which may at least be partially implemented through storage device arrays, such as RAID components. In an embodiment, network storage 114 and even server storage 118 may be embodied as iSCSI (or similar) disks that provide dynamic disk storage. Other types of storage architectures may also be used, such as storage area network (SAN), network-attached storage (NAS), or direct-attached storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices.

For the embodiment of FIG. 1, network system 100 includes a server 102 that executes a backup management process 112 automates the backup of network data using the target VM devices or the dynamic disks 114. In an embodiment, the process 112 uses certain known full and incremental (or differencing) backup techniques along with a snapshot backup process that is used to store an image or images of the system(s) to be backed up prior to the full or incremental backup operations.

In an embodiment, the network system of FIG. 1 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, server 102 may be implemented as a DDR Deduplication Storage server provided by DellEMC Corporation. However, other similar backup and storage systems are also possible. In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack.

As stated above, embodiments are used in NAS networks to provide data protection using snapshot backups. In general, NAS is a file-level storage architecture that provides a single access point for storage with built-in security, management, and fault-tolerance. In an NAS system, the storage software is usually deployed in a lightweight operating system that is embedded in the hardware. Data is transferred using TCP/IP protocols and can be formatted using a Network File Systems (NFS) protocol (such as commonly used by Linux, UNIX, and CIF S). Such a file system stores data in layers of directories and folders spanning many computers and machines in a network. A file system crawler is often used to walk a file system tree and gather information about each subdirectory and file within the tree. However, in large-scale networks, file system crawlers can be very slow due to the traversal of up to billions of files over a network mount.

Figure 2:
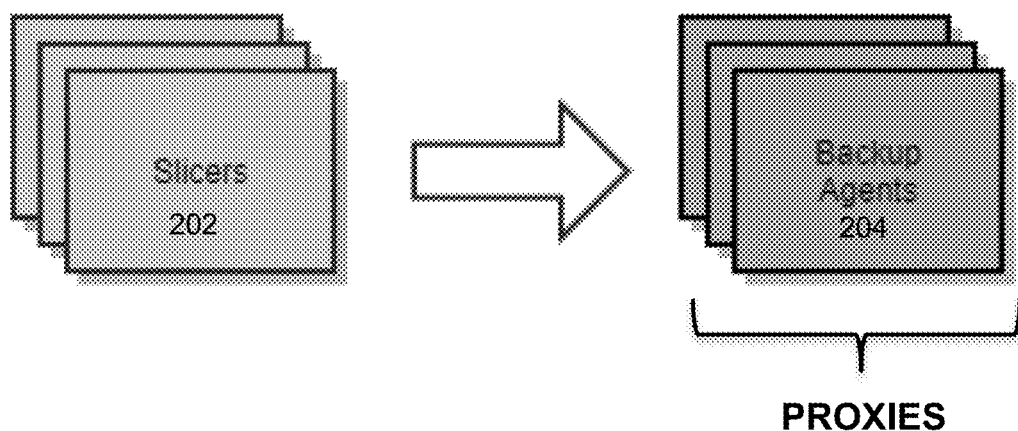
FIG. 2 illustrates the relationship of a file system slicer and backup agents for the system of FIG. 1, under some embodiments.
Figure 3:
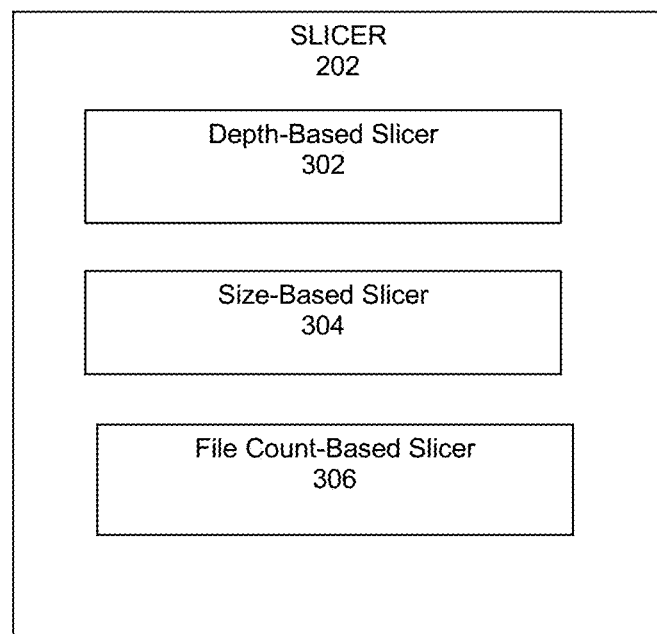
FIG. 3 illustrates three example slice techniques that can be used for the slicer, under some embodiments.

To overcome this significant disadvantage, embodiments of backup process 112 include one or more file system slicer processes 117 and backup agent(s) 119. The slicer breaks up the file system into slices (units of work), and the backup agent performs the backup tasks. FIG. 2 illustrates the relationship of a file system slicer and backup agents for the system of FIG. 1, under some embodiments. The purpose of the slicer 202 is to break up the file system in slices and hand those slices off to backup agent 204 for processing. The slicer will store all information a catalog such as a relation database or NoSQL key/value store. Any number of techniques can be used to slice the file system. FIG. 3 illustrates three example slice techniques that can be used for the slicer 202, and each slice technique solves a particular problem that is faced in present file system crawlers. As shown in FIG. 3, the file system techniques include depth-based slicing 302, size-based slicing 304, and file count-based slicing 306.

Figure 4:
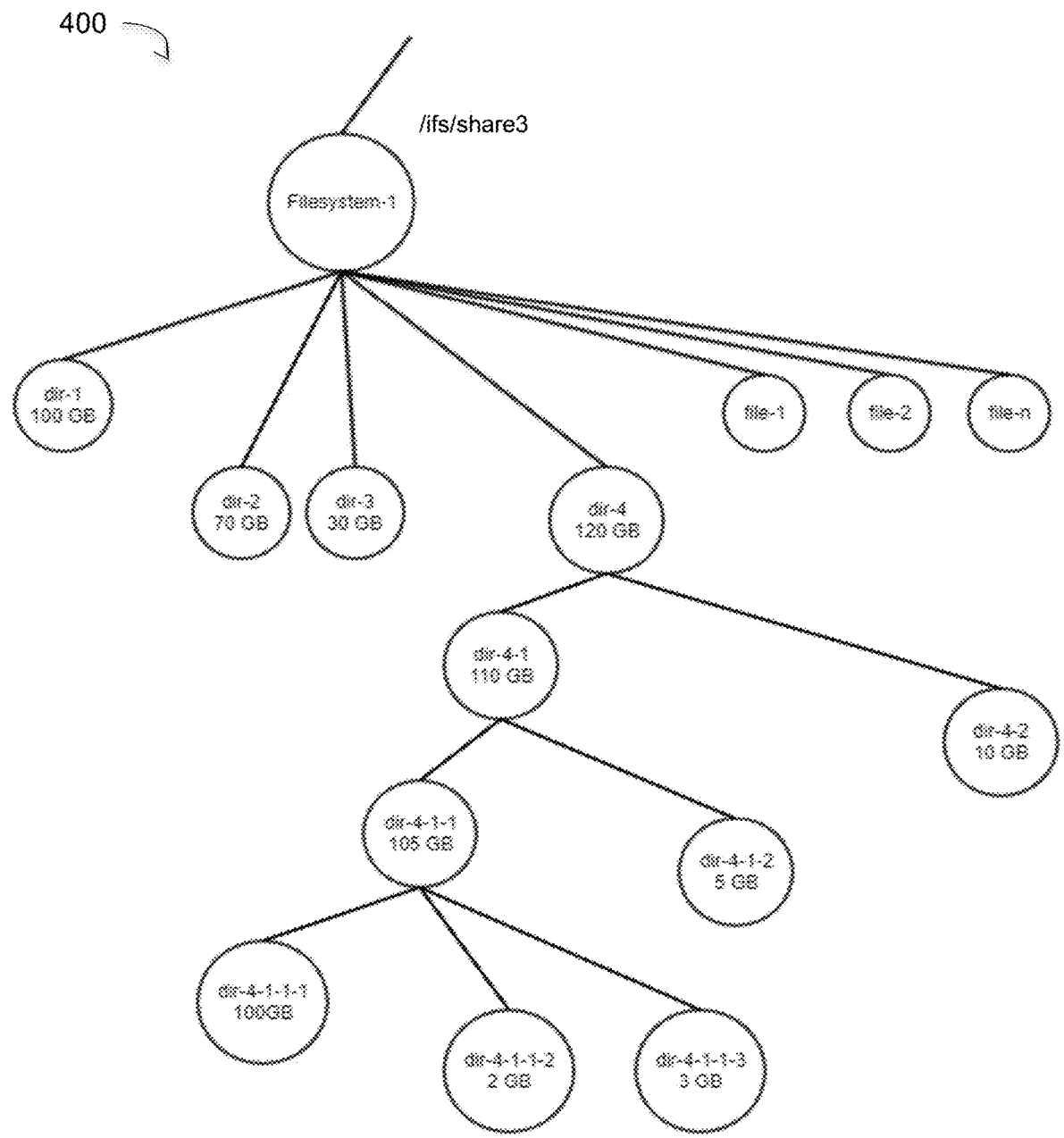
FIG. 4 is an example file system layout illustrating operation of the slicing methods of FIG. 3, under some embodiments.

FIG. 4 is an example file system layout illustrating operation of the slicing methods of FIG. 3, under some embodiments. The depth-based slicing technique 302 is usually used for file systems that are deep and dense. The slicer 202 can slice the file system by the number of directories and files and based on depth of directories and files of the share. Using the file system directory example of FIG. 4, with a proposed slice of one level depth, the slicer would return five slices: Slices 1-4 would be the directories dir-1, dir-2, dir-3 and dir-4 and slice 5 would be the files file-1, file-2 and file-n. This information is then passed to the backup agent 204.

Figure 5:
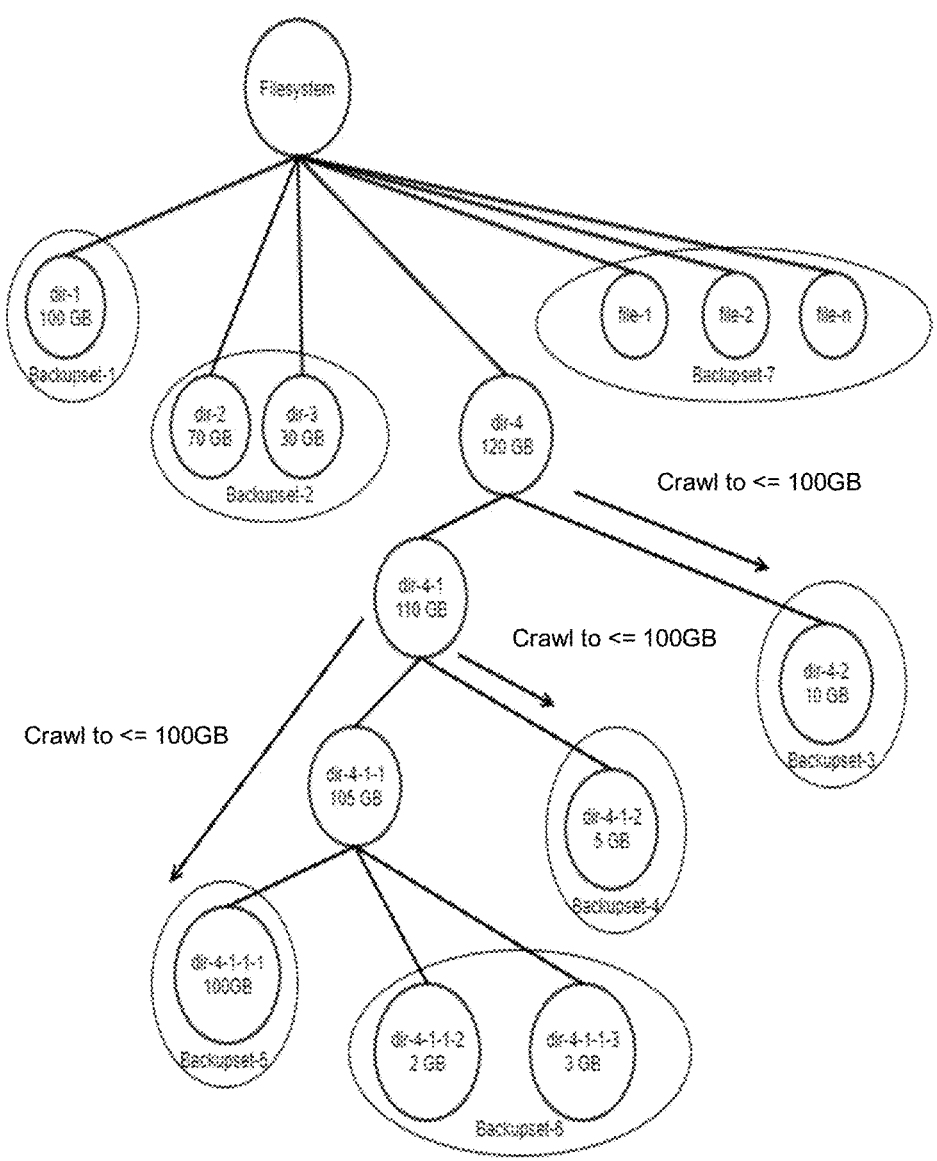
FIG. 5 illustrates the example file system layout of FIG. 4 sliced in these seven example slices.

For file systems that are large in size, size-based slicing 304 is used. In this method, the slicer 202 slices the file system by the size of files. Using the FIG. 4 example file system layout, the slicer could propose seven slices. Assuming that the slicer is configured to slice at 100 GB boundary, the slices can be as follows: Slice 1 is directory 1; Slice 2 is directories dir-2 and dir-3; Slice 3 is directory-4-2; Slice 4 is directory-4-1-2; Slice 5 is directory-4-1-1-1; Slice 6 is directory-4-1-1-2 and directory-4-1-1-3; and Slice 7 are all the files at the top most directory, assuming the combination of all is less then 100 GB. In general, a single file is the smallest unit of granularity, and a very large file can constitute a file itself. FIG. 5 illustrates the example file system layout of FIG. 4 sliced in these seven example slices. As shown in FIG. 5, Backupset-1 corresponds to Slice 1 (dir-1), Backupset-2 corresponds to Slice 2 (dir-1, dir-3), Backupset-3 corresponds to Slice 3 (dir-4-2), Backupset-4 corresponds to Slice 4 (dir-4-1-2), Backupset-5 corresponds to Slice 5 (dir-4-1-1-1), Backupset-6 corresponds to Slice 6 (dir-4-1-1-2, dir-4-1-1-3), and Backupset-7 corresponds to Slice 7 (file-1, file-2, file-3). This FIG. 5 is provided for example only, and any other combination of directories and files are possible depending on file system layout and file sizes.

Figure 6:
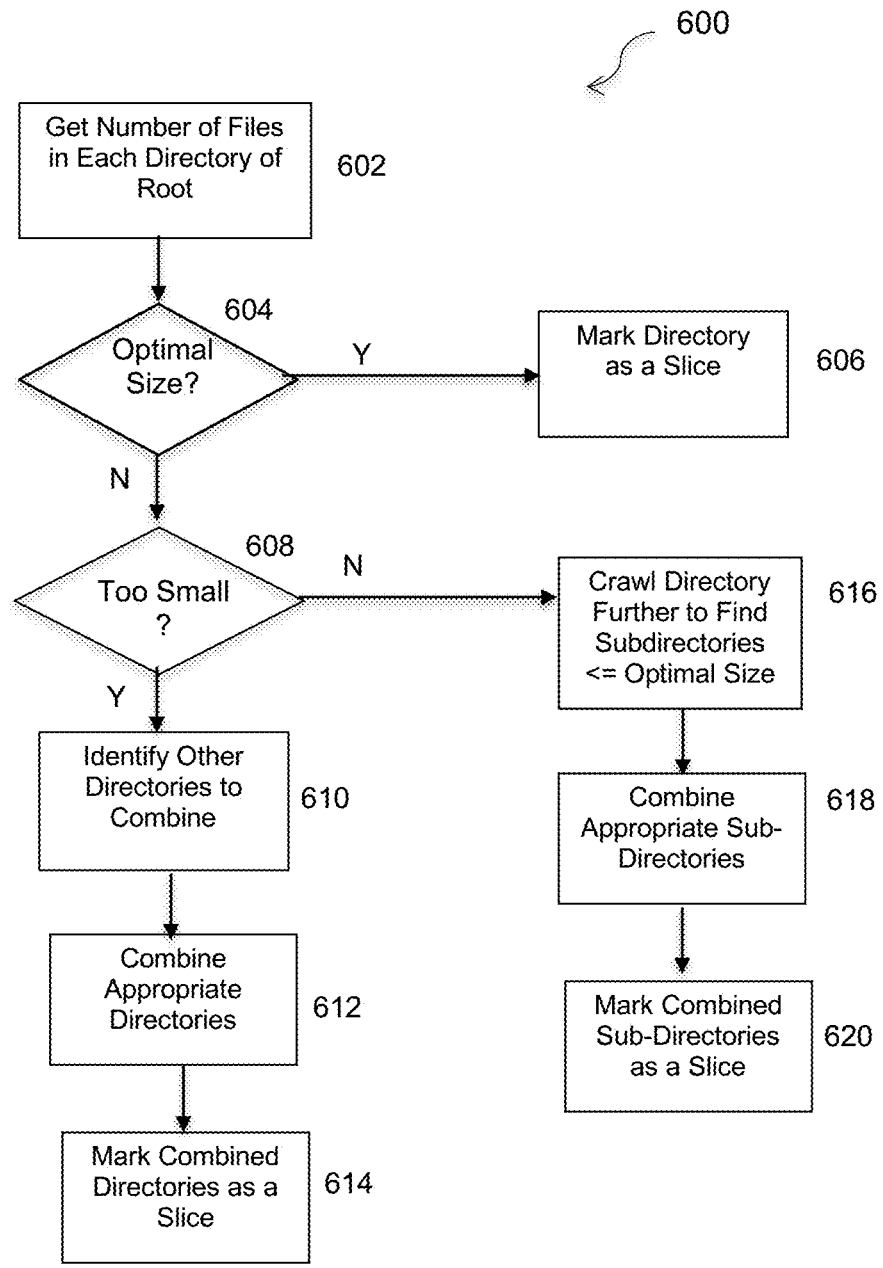
FIG. 6 is a flowchart that illustrates a method of slicing a file system by file count, under some embodiments.

For dense file systems, the slicer could perform slicing not by depth or size, but rather by the file count 306. This addresses the challenge where the file system is very dense and may have millions or even billions of small-sized files. Directories with large number of files can be broken into multiple small slices and allow backup agents to run more threads in parallel during backup. FIG. 6 is a flowchart that illustrates a method of slicing a file system by file count, under some embodiments. Process 600 starts by getting the number of files in each directory on the root of the file system, 602. In decision block 604, the number of files is compared to a defined optimum number of files for each slice, e.g., 1 million files/slice. Any directory which this optimal number of files (e.g., 1 million files or any other selected size optimal for the backup agent) is added as a slice, 606. For example, if dir-1 has 1 million files, this directory is marked this as slice-1.

If the directory is not of optimal size, it is determined whether the directory size is too small or too large with respect to the number of files. If the directory is too small, step 608, other directories are identified for combining with this directory to form a slice, 610. The appropriate directories are then combined, 612, and these combined directories are then marked as a single slice, 614. Thus, for example, if dir-2 has 700K files and dir-3 has 300K files, these two directories are combined into one slice, e.g., slice-2.

If the directory is too large (i.e., has too many files) as determined in 608, the directory is crawled further to find subdirectories with file numbers less than or equal to the optimal size, 616. For example, if Dir-4 is of size 1.2 million, in order to make up a slice of size 1 million, the process crawls through this directory further until it finds subdirectories with a number of files less than or equal to 1 million. The appropriate sub-directories are then combined, 618, and these combined sub-directories are then marked as a single slice, 620. An example of this process is shown in FIG. 5, where Backupset-3, Backupset-4, and Backupset-5 are formed by further crawling respective parent directories that are too large. These backupsets represent slices that are formed by combining the appropriate sub-directories, such as dir-4-1-1-2 and dir-4-1-1-3 for backupset 6 (slice 6).

In this method, for any files (rather than directories) on the root level, the process forms slices by combining root level files to equal the optimal number, e.g., 1 million files per slice. In this context, the number of files per slice is important, and not the size of each file (MB/GB, etc.). It should be noted that if the process slices on the number of files, it only cares about the number of files and not each file size, whereas if it slices on file sizes, it only cares about the total number of files within the slice, and not each file size.

As shown in the examples of FIG. 5, files are sliced to maintain as much contiguity as possible with respect to file and directory relationships. Maintaining contiguousness of files helps optimize later restore operations. In an embodiment, the slicer considers the contiguity of files with regard to combining directories and/or examining subdivision. As shown in FIG. 5, a backup set made up of two or more directories (e.g., Backupset-2) uses two related directories (dir-2 and dir-3). Likewise, a backup set made up of sub-directories within a directory that is too large will try to group sub-directories in a same sub-level of the directory, such as shown for Backupset-6. This contiguity may be based on logical file organization characteristics, time of creation/revision, common subject matter, common ownership, or any other characteristic used by the restore operation.

As shown in FIG. 3, the different slicing techniques 302-306 of slicer 202 use certain threshold values for the number of files and/or the size of each file. These values define a minimum or maximum value that triggers the grouping of directories into a single slice or the slicing of a directory into sub-directories for forming smaller slices. Any appropriate size or number value may be used as the threshold value for the size, file count, and depth-based slicing methods, depending on system constraints and methods. Examples given include a maximum file size of 100 GB per slice (for the size-based slicer 304 and depth-based slicer 302) or 1 million files per slice (for the file count-based slicer 306). Any other appropriate values may be used for these thresholds. Furthermore, there may be some margin or latitude given for each threshold to provide some tolerance for deviation. For example, a margin of +/−10% to 15% may be provided for either or both of the number and size threshold values. These margins may also be tunable by the user or system administrator depending on system constraints and requirements.

In an embodiment, the different slicing methods of FIG. 3 may be combined in one or more ways. For example, the slicer 303 may first slice based on the size, and then re-slice based on file count, or vice-versa. This combination technique may be used to optimize the deployment of backup agent proxies relative to the slicers and/or how to optimize contiguity of the directories and files comprising the slices.

Backup Agents

Figure 7:
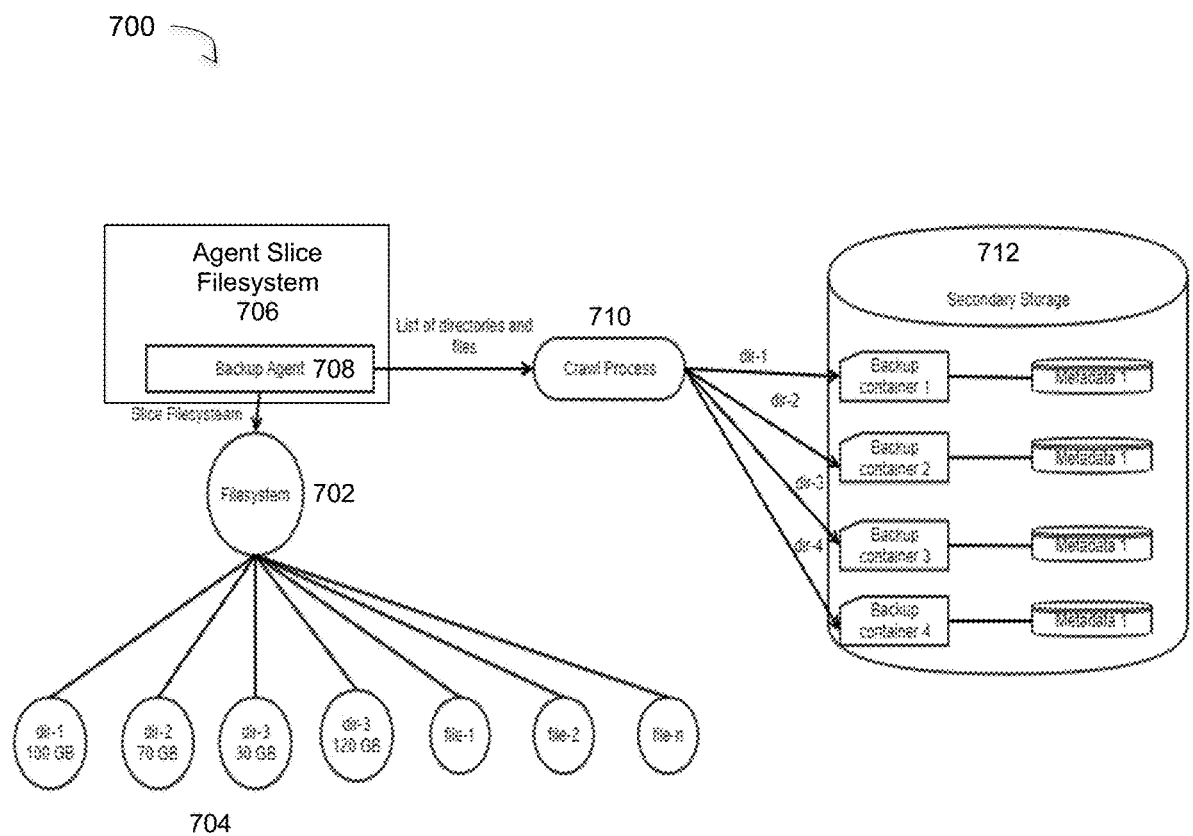
FIG. 7 illustrates in system for data processing between slicers and backup agents, under some embodiments.

As shown in FIG. 2, a number of backup agents 202 are deployed for different slicer instances 202. The backup agents act based on the information from the slicer and perform a unit of work represented by each slice. FIG. 7 illustrates in system for data processing between slicers and backup agents, under some embodiments. System 700 comprises a file system 702 that manages a number of files and directories 704, each of different sizes and compositions. System 700 includes a file system slicer agent 706 that partitions or reorganizes (slices) the directories and files of file system 702 into appropriately sized slices, using one or more of the slicing techniques described above. A backup agent 708 then sends a list of the directories and files assigned to each slice to a crawl process 710. The slices are then assigned to respective backup containers (e.g., backup containers 1-4), which are stored, along with respective metadata in a secondary storage location 712.

The crawl process 710 crawls each slice to read file data and metadata over the network and send for backup to backup media. Each slice represents a backup container in CDSF (compact disk file system) format. The crawl process crawls the slices in parallel, so that, for example, if there are 16 slices, crawl process will run 16 threads for each slice. During an incremental backup, the crawl process detects whether a file has changed since a last backup, and if not, the file will be skipped. There is generally no limit to the number of slices created or the number of threads, agents, or proxies. For example, the slicer might create 200 slices, and there may be only 16 threads. In this case a queue is formed and the process pulls slices off the queue as soon as it is done with a previous slice.

In an embodiment, the backup agents 708 use backup processes provided by a backup management process (e.g., 112 of FIG. 1). As such, they perform full, incremental, or differential backups with or without deduplication. A typical backup process comprises a full backup followed by a number of incremental backups, where the periodicity of full backups and intervening incremental backups is defined by a set backup schedule. A full backup is referred to as a 'level 0' backup. The backup agents perform certain tasks when working with level 0 backups. For example, slicing and working on a slice for level 0 requires some knowledge of the file system. This involves either a pre-scan of the file system that can inform the slicer or performing a best effort guess, such as slicing one level of depth. This is not particular interesting since it is assumed that level 0 scans happen once where an incremental backups happen each occurs afterwards. Thus, a first full backup scans all the directories and files of the file system, but it is preferable not to scan all these files again for each following incremental backup, since it can be assumed that the file system does not change drastically between incremental backups. Thus, a pre-scan procedure is used, or a method to look at past backups to provide a forecast of how the directories can be re-sliced. This pre-scan or best guess information is then stored in a catalog.

For incremental backups the slicing data and backup agents are combined. For each incremental backup, the slicer can look at the previous backup and slice using one or more of the slicing techniques as described above. This method does not require any pre-scan nor any special NAS APIs, but does provide a close enough view of the actual file system. Since slicing information is stored in a catalog, such as a relation database or NoSQL key/value store, there is no need to traverse the entire network file system.

For example, for re-slicing based on the number of files in a directory, if a directory has 10,000 sub-directories and each directory has 10,000s of files, then the crawl time will be very large. To reduce the crawl time on single directory, the process re-slices the directory based on number of files greater than the average number of files in other directories. Each backup set will be smaller and the thread run time will also be smaller.

In an example where re-slicing is based on the size of files in a directory, if a directory and its sub-directories contain files with more than a few GBs (e.g., 100 GB), then the backup time of each directory will be very large. To reduce this backup time, on each directory, re-slice the directory based on size greater than average size of other directories. Each backup set will be smaller and thread run time will also be smaller.

As shown in FIG. 3, slicer 202 includes three slicing algorithms that can be used on a number of file system types: dense file systems, large file systems and mixed file systems. In an embodiment, the process includes an automatic slicing selection process that chooses which slicing algorithm to select. This also allows the process to switch between slicing methods during a single session. For this embodiment, the slicer looks at previous backup runs and stores this knowledge of past runs so that it can switch slicing algorithms from one to another or use a combination of different slicing algorithms. The slicer makes the switch by looking at previous runs and following the set of rules associated with each algorithm. For example: if the slicer notices a directory that has a few files but each file is large in size, it can slice that directory, and that directory only, by file size. On another sub-directory, if the slicer notices a large count of files, it can slice that directory by the number of files.

Backup Agent Deployment

As shown in FIG. 2, slicers 202 use backup agents 204. In an embodiment, the multiple backup agents 204 are deployed on one or more proxies, where a proxy simply represents an execution place, such as a bundled VM. The slices are assigned to these agents. Each slice is a unit of work and is assigned to an agent 204. To deploy agents, the backup software can recommend agents or user can select agents to use. Backup agent generation depends on proxy deployment, which are typically pre-defined based on user proxy deployment settings. In general, many agents are not auto-deployed, but are instead deployed only when needed. In an alternative embodiment, agents can be automatically spawned based on need and other parameters. There can be a one-to-one association of slicers to backup agents, or one slicer to many backup agents, or a few agents can process many slices. For example, if there are 20 slices and only two agents then the slices can split among the backup agents in any appropriate manner.

Figure 8:
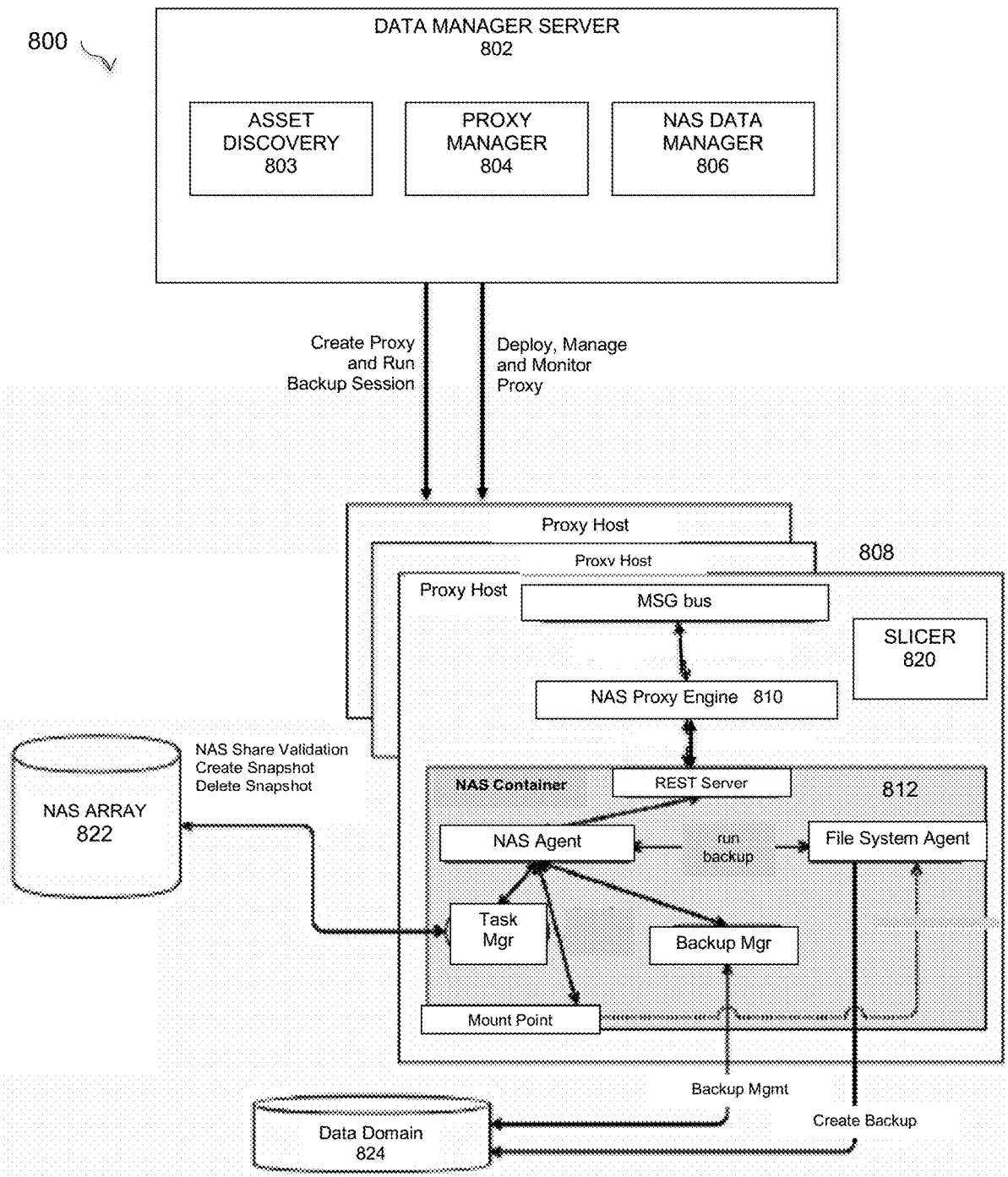
FIG. 8 illustrates the deployment of backup agents in a file system slicer process of a data management system, under some embodiments.

FIG. 8 illustrates the deployment of backup agents in a file system slicer process of a data management system, under some embodiments. System 800 can represent a system such as the DellEMC PowerProtect Data Manager (PPDM) system, though any other similar data protection system can be used.

When embodied as a PPDM system, system 800 provides cost-effective data protection for on-premises and in-cloud database workloads, Kubernetes containers, virtual machines and file systems. It is configured to automatically discover and protect databases, virtual machines, file systems and Kubernetes containers, and implement a common policy to automate compliance and governance across workloads. Cloud storage is used for backup, long-term retention and disaster recovery. It extends protection to the cloud by tiering backups to cloud storage for long-term retention to maximize retention and access to backups without impacting on-premises protection storage resources.

As shown in FIG. 8, system 800 includes a data manager server 802 that comprises certain sub-components such as for asset discovery 803, NAS data management 806 and proxy management 804. Data manager server 802 communicates with one or more proxy hosts 808 to create proxies and run backup sessions. It also deploys, manages, and monitors proxies. Each proxy host contains certain NAS data processing components for processing and storage of data in NAS arrays 822 and deduplication backup (Data Domain) storage 824. Thus, the example proxy host 808 of FIG. 8 is shown as having an NAS proxy engine 810 that controls NAS container 812 through a REST server and NAS agent. The NAS agent runs backups using a file system agent and backup manager. A task manager interacts with the NAS array 822 to create and delete snapshot copies. For the embodiment of FIG. 8, proxy host 808 also contains a slicer 820 that performs the slicing methods described above to store snapshot backups in NAS array storage 822.

In an embodiment, a backup agent is installed on a proxy host and it is installed automatically with proxy host deployment. The slicer is a sub-component of the backup agent in that it is a shared library which is embedded in the backup agent. When a backup is started, the first step of the backup agent is to create a snapshot of the file system wherever a snapshot API is available. After the snapshot is taken, it is mounted on the proxy host and then the backup agent invokes the slicer to slice the file system or share. Once the slicing is completed, the backup agent initiates a backup of all slices in parallel on single or multiple proxy hosts.

Figure 9:
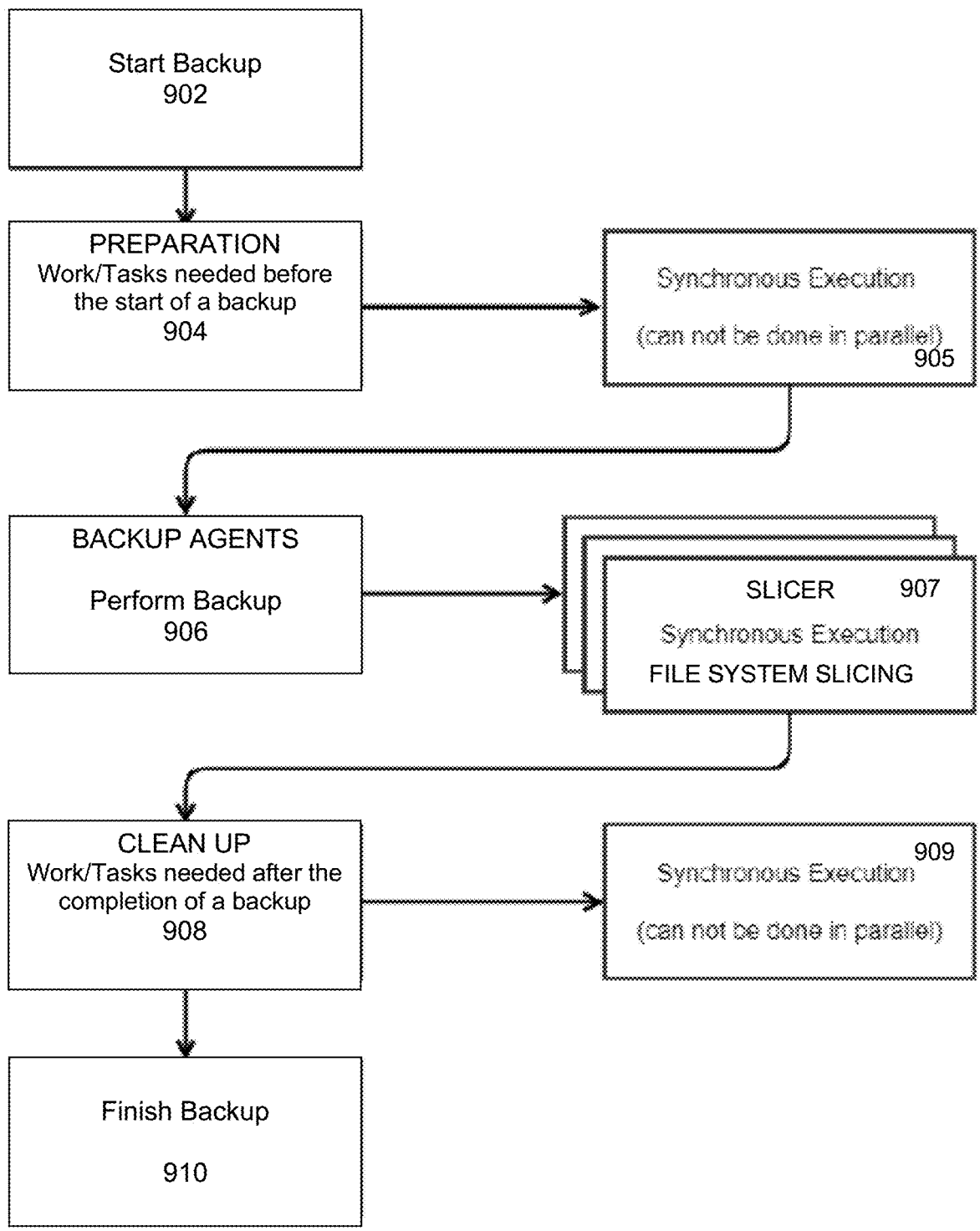
FIG. 9 illustrates an overall backup operation incorporating file system slicing, under some embodiments.

In an embodiment, the slicer and backup agent operations are performed as part of an overall data backup process executed by backup management process 112 of FIG. 1. FIG. 9 illustrates an overall backup operation incorporating file system slicing, under some embodiments. As shown in FIG. 9, the process begins by starting a backup operation, 902. This triggers the execution of backup preparation tasks 904 that need to be performed, such as file system crawling to catalog files, etc. This is a synchronous execution 905 that is done sequentially by a crawler or similar process. One or more backup agents are then deployed to perform the backup of the file system, 906. The slicer process performs file system slicing according to one or more of the slicing algorithms described above as a synchronous execution, 907. The process then performs clean up tasks, 908, such as garbage collection and so on, which may include some synchronous operations 909, and the backup operation is then finished, 910.

This process includes deleting snapshots created for backup purposes, creating the metadata record file to record the backup details of the NAS file system or share, transferring the logs to a server and providing telemetry data, such as how much data is being backed up, how many slices were used, a list of backup containers and metadata records for each backup container. Similarly, if a backup failed or was canceled for any reason, the cleanup tasks clean up all the items mentioned above so that the system is returned to a good state, where the system is the NAS system, the data protection software, and/or the data protection storage (e.g., Data Domain).

Embodiments of the file system slicer and backup agents overcome disadvantages of previous file system crawlers that can take excessively time to crawl large file systems. Embodiments provide different slicing algorithms to reorganize the file data, use previous runs to inform re-slicing, and automatically select slicing algorithms to adapt to the system in real time.

Although embodiments have been described with respect to network backup comprising certain specific technologies, Data Domain backup servers, and certain backup agents or processes, such as vProxy, it should be noted that embodiments are not so limited, and that other backup systems and methods may also utilize the methods described herein.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 10:
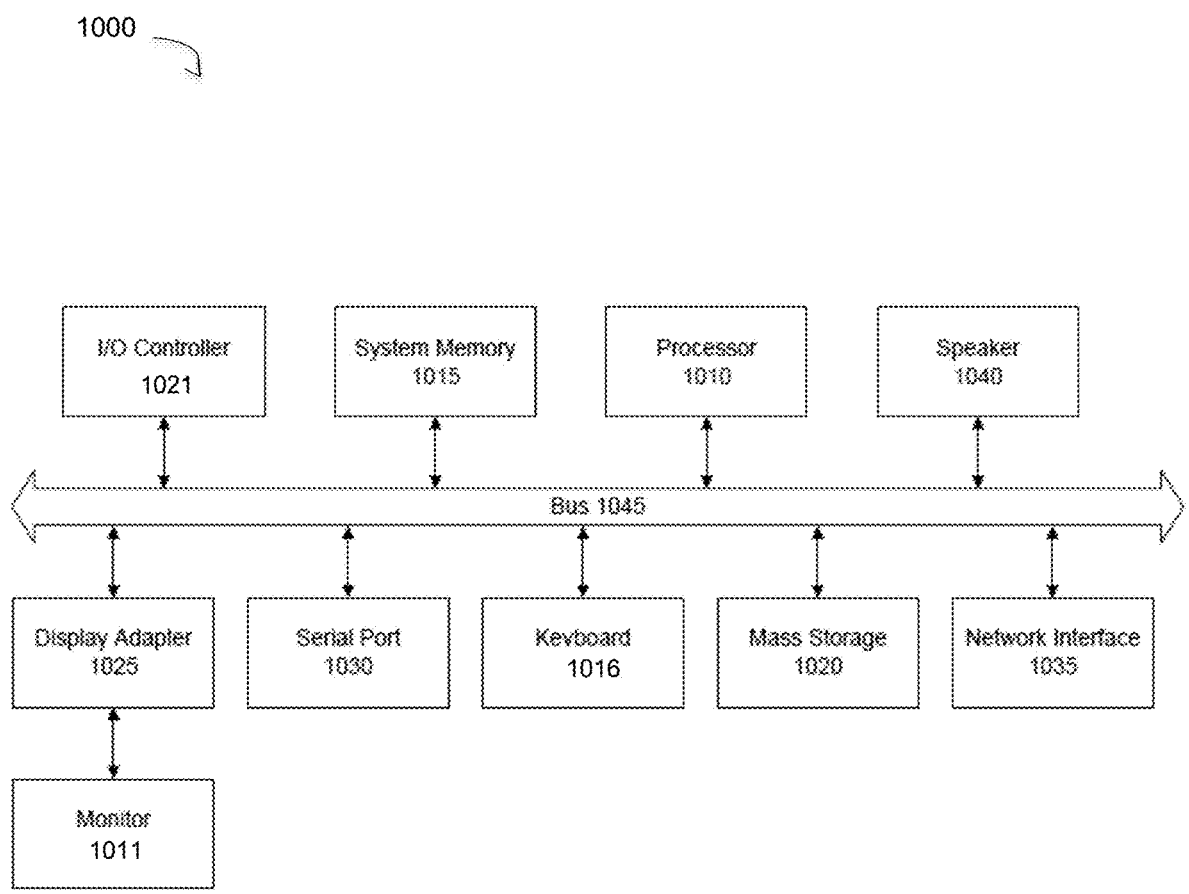
FIG. 10 is a block diagram of a computer system used to execute one or more software components of a system for executing predictive scheduled backups, under some embodiments.

FIG. 10 is a block diagram of a computer system used to execute one or more software components of a system for a file system slicer and back up agent deployment process, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 10 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of storing array snapshots of a file system in networked attached storage (NAS) device, comprising:

determining an organization of the file system comprising directories and files in a defined hierarchy;

determining a size of each file and a number of files in each directory;

slicing the file system into a number of slices according to a combined slicing method comprising file size-based slicing for large file systems, and file count-based slicing for dense file systems, wherein each slice contains files having a defined total size and a defined number of files, wherein the large file systems are used in metropolitan-area network (MAN) scale networks, and the dense file systems comprise millions of files;

deploying backup agents to back up the slices to the NAS device, wherein the backup agents are installed on an as-needed basis on one or more proxy hosts automatically with proxy host deployment; and storing the backed up slices as array snapshots in the NAS device.

2. The method of claim 1 further comprising:

defining a first threshold value for the defined total size of files in each slice with a first margin of deviation; and defining a second threshold value for the defined number of files in each slice with a second margin of deviation.

3. The method of claim 2 wherein for the file size-based slicing, the method further comprises;

crawling the file system;

identifying directories having files having a total size below the first threshold value; and combining files from identified directories to form slices each having files of a total size within the first margin of deviation of the first threshold value.

4. The method of claim 3 wherein the slices contain contiguous files within the file system hierarchy.

5. The method of claim 2 wherein for the file count-based slicing, the method further comprises;

crawling the file system;

identifying directories having a number of files below the second threshold value; and combining files from identified directories to form slices each having files of a total file count within the second margin of deviation of the second threshold value.

6. The method of claim 5 wherein the slices contain contiguous files within the file system hierarchy.

7. The method of claim 2 wherein the combined slicing further comprises slicing based on file system depth for deep and dense file system, and comprising:

forming slices from directories within a single level of the defined hierarchy of the file system with each slice containing files of a count below the first threshold value and a total size below the second threshold value; and forming different slices from files within the single level of the defined hierarchy wherein each slice of the different slices containing files each below the second threshold value.

8. The method of claim 7 further comprising:

selecting the depth-based slicing, file size-based slicing, and file count-based slicing method to be performed in a particular order within the combined slicing to generate a first set of slices;

compiling past slice data from previous backup operations; and changing from a first method of slicing to a second method of slicing in a different order within the combined slicing based on the past slice data to optimize a present slicing operation with respect to a backup operation performed by the backup agents.

9. The method of claim 8 wherein the backup operation comprises a full backup followed by one or more incremental backups, and wherein the method further comprises:

storing, in a catalog, slicing results after each of the full and one or more incremental backups;

determining, prior to each incremental backup, slicing results of a next previous full or incremental backup; and re-slicing the file system based on file count to reduce crawl time on a directory based on a number of files greater than an average number of files in other directories.

10. The method of claim 8 wherein the backup operation comprises a full backup followed by one or more incremental backups, and wherein the method further comprises:

storing, in a catalog, slicing results after each of the full and one or more incremental backups;

determining, prior to each incremental backup, slicing results of a next previous full or incremental backup; and re-slicing the file system based on file size to reduce backup time of the backup operation based on a size of files greater than an average size of files in other directories.

11. The method of claim 1 wherein the one or more proxy hosts are deployed in a client of a data management system in relation to the number of slices.

12. The method of claim 11 wherein the deployment of backup agents is performed by one of an automated process based on the number of slices, and one of a pre-defined manual process.

13. The method of claim 11 further comprising:

dynamically computing a number of parallel backup streams depending on a layout of the file system; and performing the slicing methods to provide for balanced file system recovery of the backed up data.

14. A computer-implemented method of protecting data in a network attached storage (NAS) network through array snapshot backups of files within directories of a file system, comprising:

deploying backup agents on an as-needed basis on one or more proxy hosts automatically with a proxy host deployment;

slicing, for a backup operation, directories containing the files based on a combined slicing method based on a combination of a size of files within the directories, number of files within the directories, and depth of a hierarchy of the file system;

compiling slicing data for the backup operation based on the combined slicing method utilizing a first order of slicing; and re-slicing the directories using a different order of slicing for a next backup operation based on the compiled data to optimize throughput of the next backup operation.

15. The method of claim 14 wherein the slicing is performed by a slicer component implemented as a shared library embedded in one or more backup agents initiating the backup operation, and wherein the combined slicing method comprises-file size-based slicing for large file systems, and file count-based slicing for dense file systems, and file system depth-based slicing for deep and dense file systems, wherein the large file systems are used in metropolitan-area network (MAN) scale networks, and the dense file systems comprise millions of files.

16. The method of claim 15 wherein the one or more proxy hosts are deployed in a client of a data management system supporting the backup operation.

17. A system for storing array snapshots of a file system in networked attached storage (NAS) device, comprising:

a crawler component determining an organization of the file system comprising directories and files in a defined hierarchy, and determining a size of each file and a number of files in each directory;

a slicer slicing the file system into a number of slices according to a combined slicing method comprising depth-based slicing, file size-based slicing, and file count-based slicing performed in a first sequence order of slicing, wherein each slice contains at least one of: files having a defined total size or a defined number of files;

one or more backup agents deployed to back up the slices to the NAS device, wherein the backup agents are installed on an as-needed basis on one or more proxy hosts automatically with proxy host deployment; and an NAS storage storing the backed up slices as array snapshots.

18. The system of claim 17 wherein the one or more proxy hosts are deployed in a client of a data management system supporting the backup operation, and wherein the slicer is implemented as a shared library embedded in the backup agents, and wherein the combined slicing method comprises-file size-based slicing for large file systems, and file count-based slicing for dense file systems, and file system depth slicing for deep and dense file systems, wherein the large file systems are used in metropolitan-area network (MAN) scale networks, and the dense file systems comprise millions of files.

19. The system of claim 18 further wherein the slicer and backup agents further dynamically compute a number of parallel backup streams depending on a layout of the file system; and re-perform the slicing in a different sequence order of slicing to provide for balanced file system recovery of the backed up data.

20. The system of claim 19 wherein the slices contain contiguous files within the file system hierarchy.

* * * * *